(12) United States Patent
Sertier

(10) Patent No.: US 11,938,447 B2
(45) Date of Patent: Mar. 26, 2024

(54) FLUID INJECTOR, ASSEMBLY AND EXHAUST LINE COMPRISING SUCH AN INJECTOR

(71) Applicant: FAURECIA SYSTEMES D'ECHAPPEMENT, Nanterre (FR)

(72) Inventor: Bruno Sertier, Morvillars (FR)

(73) Assignee: FAURECIA SYSTEMES D'ECHAPPEMENT (FR)

(*) Notice: Subject to any disclaimer, the term of this patent is extended or adjusted under 35 U.S.C. 154(b) by 0 days.

(21) Appl. No.: 17/851,459

(22) Filed: Jun. 28, 2022

(65) Prior Publication Data
US 2023/0001354 A1    Jan. 5, 2023

(30) Foreign Application Priority Data
Jun. 30, 2021  (FR) .................................. 21 07078

(51) Int. Cl.
| | |
|---|---|
| B01D 53/94 | (2006.01) |
| B01F 23/213 | (2022.01) |
| B01F 25/30 | (2022.01) |
| F01N 3/20 | (2006.01) |
| F01N 13/10 | (2010.01) |

(52) U.S. Cl.
CPC ..... *B01D 53/9431* (2013.01); *B01D 53/9418* (2013.01); *B01F 23/2132* (2022.01); *B01F 25/30* (2022.01); *F01N 3/2066* (2013.01); *F01N 13/10* (2013.01); *F01N 2260/02* (2013.01); *F01N 2260/024* (2013.01); *F01N 2570/18* (2013.01); *F01N 2610/02* (2013.01); *F01N 2610/08* (2013.01); *F01N 2610/11* (2013.01); *F01N 2610/1453* (2013.01); *F01N 2610/1473* (2013.01); *F01N 2900/1406* (2013.01); *F01N 2900/1616* (2013.01);
(Continued)

(58) Field of Classification Search
CPC combination set(s) only.
See application file for complete search history.

(56) References Cited

U.S. PATENT DOCUMENTS

| | | | |
|---|---|---|---|
| 2009/0229258 A1* | 9/2009 | Zapf | F04B 17/03 60/295 |
| 2011/0023466 A1* | 2/2011 | Branco | F01N 3/208 60/286 |

(Continued)

FOREIGN PATENT DOCUMENTS

| | | |
|---|---|---|
| DE | 102006022582 A1 | 11/2007 |
| JP | 2021092207 A | 6/2021 |

OTHER PUBLICATIONS

French Preliminary Search Report for Application No. 21 07078 dated Feb. 25, 2022.

*Primary Examiner* — Binh Q Tran
(74) *Attorney, Agent, or Firm* — Carlson, Gaskey & Olds, P.C.

(57) ABSTRACT

An injector is provided to inject an aqueous urea solution into an exhaust line. The injector comprises a single fluid inlet, an injection passage, fluidly connecting the inlet to the injection port, and a shut-off device for the injection port. The shut-off device further comprises an actuator that is configured to selectively move a shutter between open and closed positions. A cooling passage is fluidly connected to the injection passage and is configured to cool the actuator. A fluid pressure regulator is interposed in the cooling passage.

12 Claims, 6 Drawing Sheets

(52) U.S. Cl.
CPC ......... *F01N 2900/1806* (2013.01); *F01N 2900/1808* (2013.01); *F01N 2900/1821* (2013.01)

(56) References Cited

U.S. PATENT DOCUMENTS

| | | | |
|---|---|---|---|
| 2013/0055701 A1* | 3/2013 | Yan | F01N 3/208 60/287 |
| 2013/0118155 A1* | 5/2013 | Domon | F01N 3/10 60/274 |
| 2013/0259755 A1* | 10/2013 | Kim | B01D 53/92 422/111 |
| 2015/0198074 A1* | 7/2015 | Mori | F01N 13/1805 60/286 |
| 2018/0106180 A1 | 4/2018 | McFarland et al. | |
| 2018/0328249 A1 | 11/2018 | Upadhye et al. | |
| 2019/0292962 A1* | 9/2019 | Wang | F01N 3/28 |
| 2020/0408122 A1* | 12/2020 | Johnson | F01N 13/146 |

* cited by examiner

FLUID INJECTOR, ASSEMBLY AND EXHAUST LINE COMPRISING SUCH AN INJECTOR

CROSS-REFERENCE TO RELATED APPLICATIONS

This application is a U.S. non-provisional application claiming the benefit of French Application No. FR 21 07078, filed on Jun. 30, 2021, which is incorporated herein by reference in its entirety.

TECHNICAL FIELD

The disclosure relates generally to fluid injectors in an exhaust pipe, the fluid being an aqueous urea solution.

BACKGROUND

Such an injector may comprise a fluid inlet and a fluid injection port in the exhaust line, with an injection passage fluidly connecting the inlet to the injection port.

The injector may further comprise a shut-off device with a shutter movable between an open position, authorizing the circulation of fluid through the injection port, and a closed position, prohibiting the circulation of fluid through the injection port, as well as an actuator, configured to selectively move the shutter between its open and closed positions.

The fluid injector is supplied from a reservoir, via a pump.

In such an injector, the actuator is subjected to high temperatures at certain engine speeds wherein the gases circulating through the exhaust line are at high temperatures. This can eventually lead to early damage of the actuator.

In addition, with some pump types, the pressure of the fluid supplied to the injector is not constant, so that the metering of the fluid injected into the exhaust line is imprecise.

In this context, the disclosure is to propose a fluid injector that does not have the above defects.

SUMMARY

The disclosure relates to a fluid injector in an exhaust pipe, wherein a fluid is an aqueous urea solution, the fluid injector comprising:
  a single fluid inlet;
  a fluid outlet;
  a fluid injection port in the exhaust pipe;
  an injection passage, fluidly connecting the single fluid inlet to the fluid injection port;
  a shut-off device comprising a shutter, movable between an open position, authorizing the circulation of fluid through the fluid injection port, and a closed position, prohibiting the circulation of fluid through the fluid injection port, as well as an actuator, configured to selectively move the shutter between the open and closed positions;
  a cooling passage, having an upstream portion, fluidly connected to the injection passage and a downstream portion, connected to the fluid outlet, the cooling passage being configured so that the circulation of fluid along the cooling passage cools the actuator of the shut-off device;
  a fluid pressure regulator interposed in the cooling passage.

As such, the fluid injector has a passage provided for cooling the actuator of the shut-off device. This cooling is achieved by circulating the same fluid as that which is injected into the exhaust pipe. This simplifies the injector arrangement onboard the vehicle, since it is unnecessary to connect this injector to another fluid source, such as the engine cooling circuit.

Advantageously, the injection passage and the cooling passage are served by a single fluid inlet. This also helps to simplify the mounting of the fluid injector, since it is unnecessary to have one pipe serving the injection passage and another serving the cooling passage. The injector is connected to a single pipe, which simplifies its arrangement onboard the vehicle. The injector takes up less space.

In addition, the cooling passage is used to house a fluid pressure regulator, which makes it possible to even the pressure of the fluid supplied to the injector. The dosage of the fluid injected into the exhaust line is thus improved. This advantage is obtained without significantly increasing the size of the injector.

The fluid injector may further have one or more of the following features, considered individually or in any technically possible combination:
  the pressure regulator is configured to regulate a pressure of the fluid entering through the single fluid inlet;
  the pressure regulator comprises a base, closing a section of the cooling passage with a regulating opening for the passage of fluid, a piston, a flexible member arranged to bias the piston in a closed position of closing the regulating opening, the piston being movable under the effect of the pressure of the fluid against application of bias exerted by the flexible member from the closed position into a range of positions in which the regulating opening is open;
  the shut-off device is a solenoid valve, the actuator comprising a magnetic coil cooled by the circulation of fluid;
  the magnetic coil is arranged around an intermediate section of the injection passage, extending along a central axis, the cooling passage comprising a cooling portion arranged around the magnetic coil, an upstream chamber fluidly communicating with the cooling portion and located radially outward of the cooling portion, a downstream chamber fluidly communicating with the cooling portion and located radially outward of the cooling portion, the upstream portion connecting the upstream chamber to the injection passage;
  the fluid pressure regulator is arranged in the upstream portion;
  the upstream portion opens into an inlet section of the injection passage, located between the fluid inlet and the intermediate section;
  the injection passage comprises a fluid heating chamber and a fluid inlet port, opening into the heating chamber, the injector comprising a further shut-off device comprising a further shutter, movable between an open position, authorizing the circulation of fluid through the fluid inlet port, and a closed position, prohibiting the circulation of fluid through the fluid inlet port, and another actuator, configured to selectively move the other shutter between its open and closed positions.

According to a second aspect, the disclosure relates to an assembly comprising a fluid reservoir, a pump that has suction connected to the fluid reservoir and a discharge, and an injector that has the above features, the single fluid inlet being fluidly connected to the pump discharge and the fluid outlet being fluidly connected to the reservoir.

According to a third aspect, the disclosure relates to an exhaust line comprising an exhaust line and an assembly having the above features, the injector being configured to inject fluid into the exhaust pipe.

BRIEF DESCRIPTION OF THE DRAWINGS

Further features and advantages of the disclosure will be apparent from the detailed description given below by way of indication and not in any way limiting, with reference to the appended Figures, of which.

DETAILED DESCRIPTION

In the following, the terms upstream and downstream are defined in relation to the general direction of fluid flow, which may be the aqueous urea solution or the exhaust gases.

Figure 1:
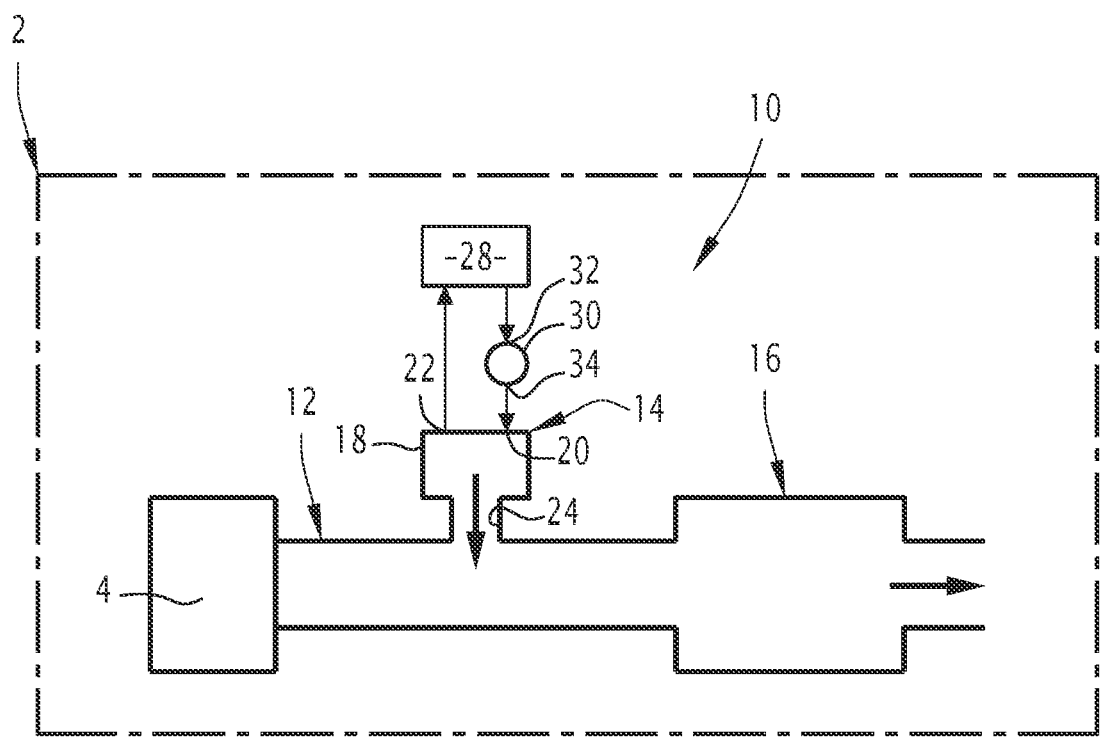
FIG. 1 is a simplified schematic representation of a vehicle with an exhaust line according to the disclosure.

A vehicle 2 is shown schematically in FIG. 1.

The vehicle 2 is typically a land vehicle, such as a car, truck, bus, van, or other vehicle traveling on a road.

In a variant, the vehicle is a train or a boat.

The vehicle 2 comprises an internal combustion engine 4 and an exhaust line 10, the exhaust line 10 receiving the exhaust gases emitted by the internal combustion engine 4.

The engine 4 is typically a diesel engine.

The exhaust gases are purified in the exhaust line 10 and the purified exhaust gases are then discharged into the environment.

The exhaust line 10 comprises an exhaust pipe 12, through which the exhaust gases circulate, and an assembly 14, arranged to inject a fluid into the exhaust pipe 12.

The exhaust pipe 12 has an upstream end, connected to a manifold (not shown) that collects the exhaust gases produced by the combustion engine 4.

The exhaust line 10 comprises a selective catalytic reduction (SCR) purification member 16, interposed along the exhaust pipe 12 downstream of the injection assembly 14.

The purification member 16 reduces the $NO_x$ in the exhaust gas to $N_2$ in the presence of ammonia. The ammonia is generated from the urea in the assembly 14 and/or in the exhaust pipe 12.

The exhaust line 10 typically comprises other components not shown in FIG. 1: a catalytic oxidation device, a particulate filter, the turbocharger turbine, one or more silencers, etc.

The fluid is an aqueous urea solution, such as AUS32 (for "Aqueous Urea Solution"), also commonly known as ADBLUE®. This fluid is sometimes referred to as diesel exhaust fluid (DEF).

ADBLUE® is an aqueous urea solution composed of 32.5% urea and 67.5% demineralized water by mass.

In a variant, another aqueous urea solution is used, with a urea concentration other than 32.5% by mass, for example.

The injection assembly 14 comprises an injector 18, shown in more detail in FIGS. 2 through 5.

The injector 18 comprises a single fluid inlet 20, a fluid outlet 22, a fluid injection port 24 into the exhaust pipe 12, and an injection passage 26, fluidly connecting the inlet 20 to the injection port 24.

The assembly 14 also comprises a fluid reservoir 28, a pump 30 that has a suction 32 connected to the fluid reservoir 28 and a discharge 34, with the single fluid inlet 20 connected to the discharge 34 of the pump 30 (FIG. 1). The fluid outlet 22 is fluidly connected to the reservoir 28.

The fluid inlet 20 is said to be single because the injector 18 has no fluid inlet other than the single inlet 20. Thus, the injector 18 has a single inlet for the fluid 20.

Figure 2:
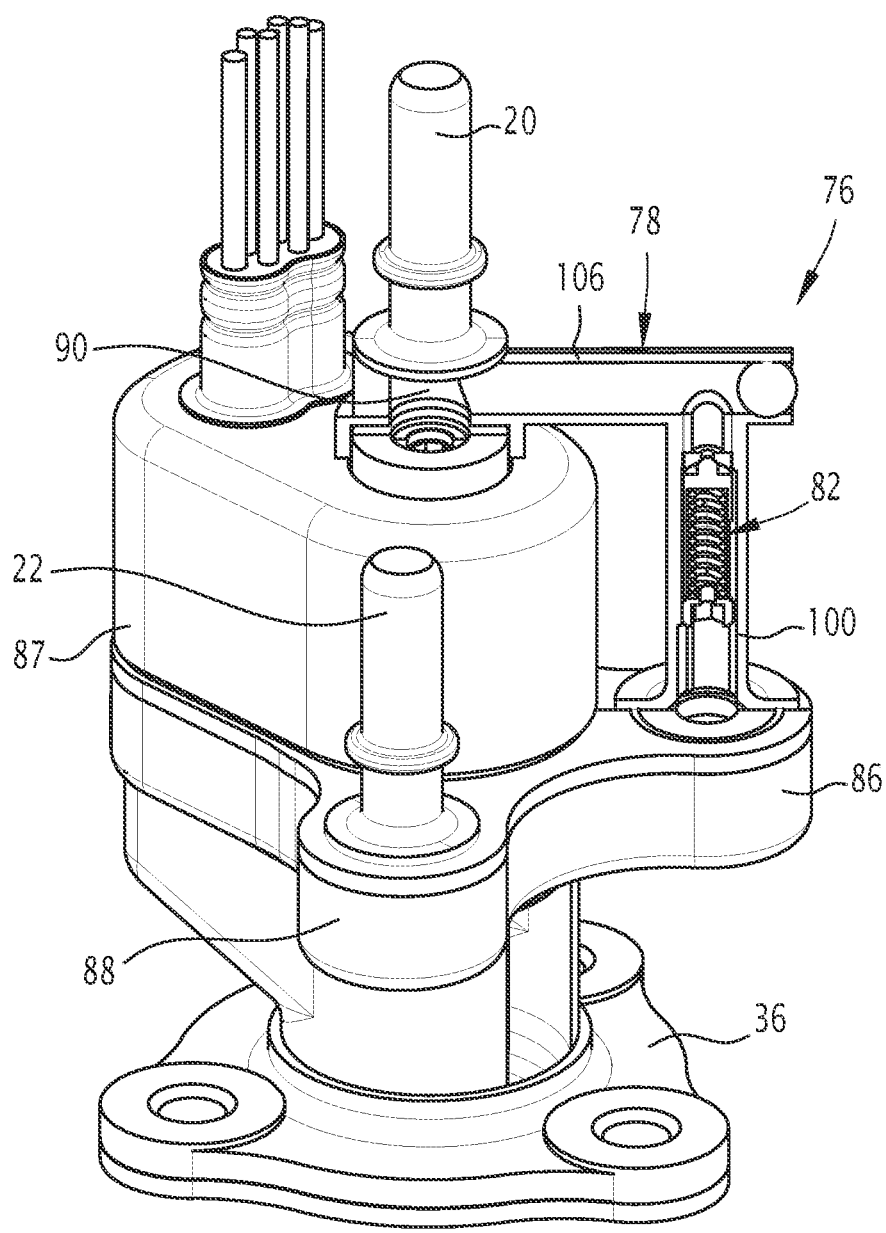
FIG. 2 is a perspective view of the injector of the exhaust line of FIG. 1, with a part of the cooling passage being shown, in cross-section, to reveal the pressure regulator.

The injector 14 is typically attached to the pipe 12 using an attachment flange 36 (visible in FIG. 2).

In the example shown, the inlet 20 and the injection port 24 are located at two opposite ends of the injector 18 along an X axis.

The injection passage 26 extends substantially axially from the inlet 20 to the injection port 24.

The injection port 24 typically opens directly into the exhaust pipe 12.

Figure 5:
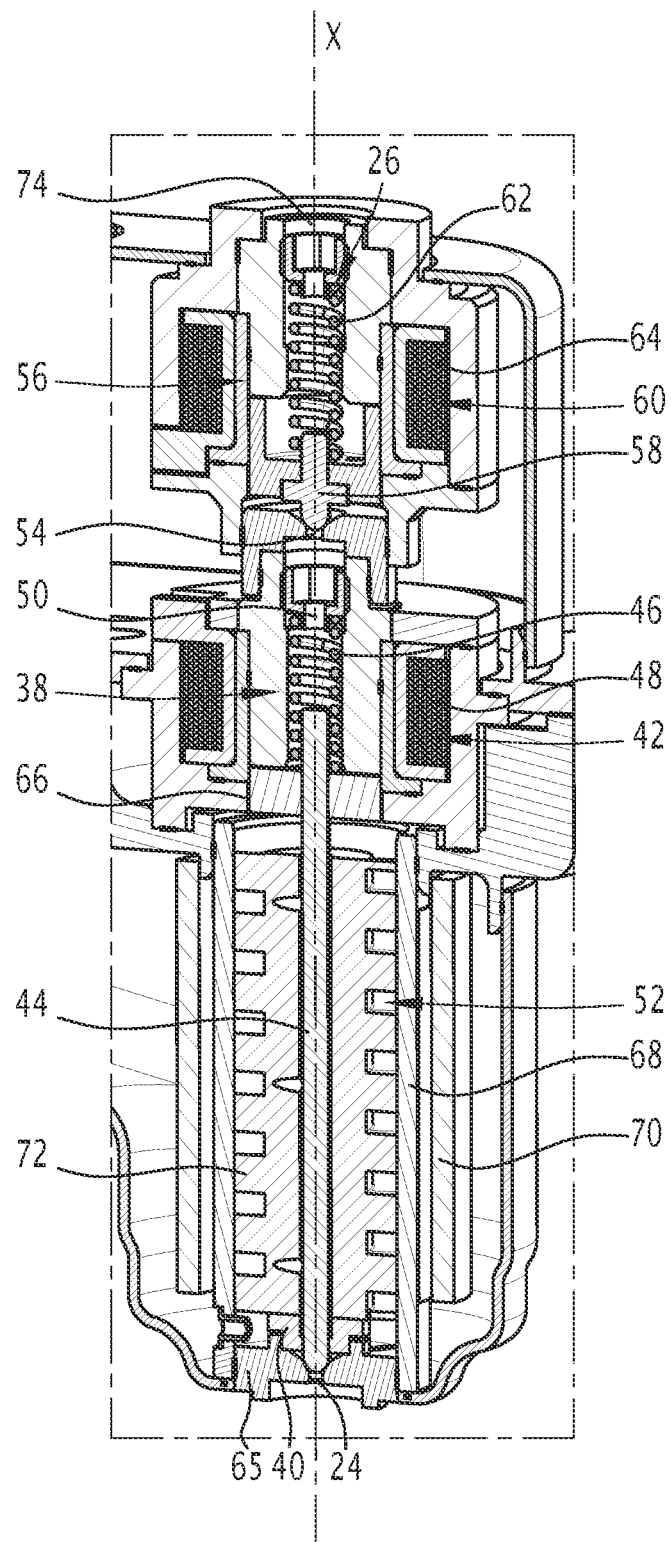
FIG. 5 is an enlarged cross-sectional view of part of the injection passage and the shut-off devices.

The injector 14 further comprises a shut-off device 38 with a shutter 40, movable between an open position, authorizing the circulation of fluid through the injection port 24, and a closed position, prohibiting the circulation of fluid through the injection port 24 (FIG. 5).

The shut-off device 38 also comprises an actuator 42, configured to selectively move the shutter 40 between its open and closed positions.

In the example shown, the shut-off device 38 is a solenoid valve.

The shutter 40 is rigidly attached to a sliding rod 44.

The actuator 42 comprises a flexible member 46, such as a spring, interacting with the end of the rod 44 opposite the shutter 40. It applies the shutter 40, toward its closed position, via the rod 44.

The actuator 42 also comprises a magnetic coil 48. When activated, the magnetic coil 48 moves the shutter 40 to its open position, via the rod 44, against the restoring force of the flexible member 46.

The magnetic coil 48 is arranged around an intermediate section 50 of the injection passage 26.

The intermediate section 50 extends along the X axis.

The flexible member 46 is located within the intermediate section 50.

In the illustrated example, the injection passage 26 comprises a fluid heating chamber 52, with a fluid inlet port 54 controlling the admission of fluid into the heating chamber 52.

The injector 14 comprises yet another shut-off device 56, with another shutter 58 movable between an open position, authorizing the circulation of fluid through the fluid inlet port 54, and a closed position, prohibiting the circulation of fluid through the fluid inlet port 54.

The other shut-off device 56 also comprises a further actuator 60, configured to selectively move the other shutter 58 between its open and closed positions.

Typically, the other actuator 60 is of the same type as the actuator 38. It comprises a flexible member 62 such as a spring, applying the other shutter 58 toward its closed position. It also comprises a magnetic coil 64, arranged to move the other shutter 58 to its open position against the restoring force of the flexible member 62.

As illustrated in FIG. 5, the heating chamber 52 constitutes the downstream end of the injection passage 26.

It is closed off from the exhaust pipe 12 by a plate 65 in which the injection port 24 is formed.

The rod 44 passes entirely through the heating chamber 52.

The fluid inlet port 54 is arranged upstream of the intermediate section 50, that is, between the single inlet 20 and the intermediate section 50.

The intermediate section 50 communicates with the heating chamber 52 via channels 66 visible in FIG. 5.

The heating chamber 52 is closed radially outwardly by a wall 68. A heating member 70, such as an electrical resistor, is positioned around the wall 68, and heats the fluid within heating chamber 52 by conduction through the wall 68.

A helical member 72 is positioned within the heating chamber 52, and defines a helical passageway in the heating chamber for the fluid, from the axial end of the chamber 52 located toward the intermediate section 50 to the axial end of the chamber 52 located at the injection port 24.

The other magnetic coil 64 is offset axially toward the inlet 20 from the magnetic coil 48. It is located around another intermediate section 74 of the injection passage 26. The flexible member 62 is located in the other intermediate section 74.

The intermediate section 50 and the other intermediate section 74 are located on opposite sides of the inlet port 54.

According to the disclosure, the injector 14 comprises a cooling passage 76, having an upstream portion 78 fluidly connected to the injection passage 26 and a downstream portion 80 fluidly connected to the fluid outlet 22.

The cooling passage 76 is configured so that the circulation of fluid along the cooling passage cools the actuator 42 of the shut-off device 38.

Figure 3:
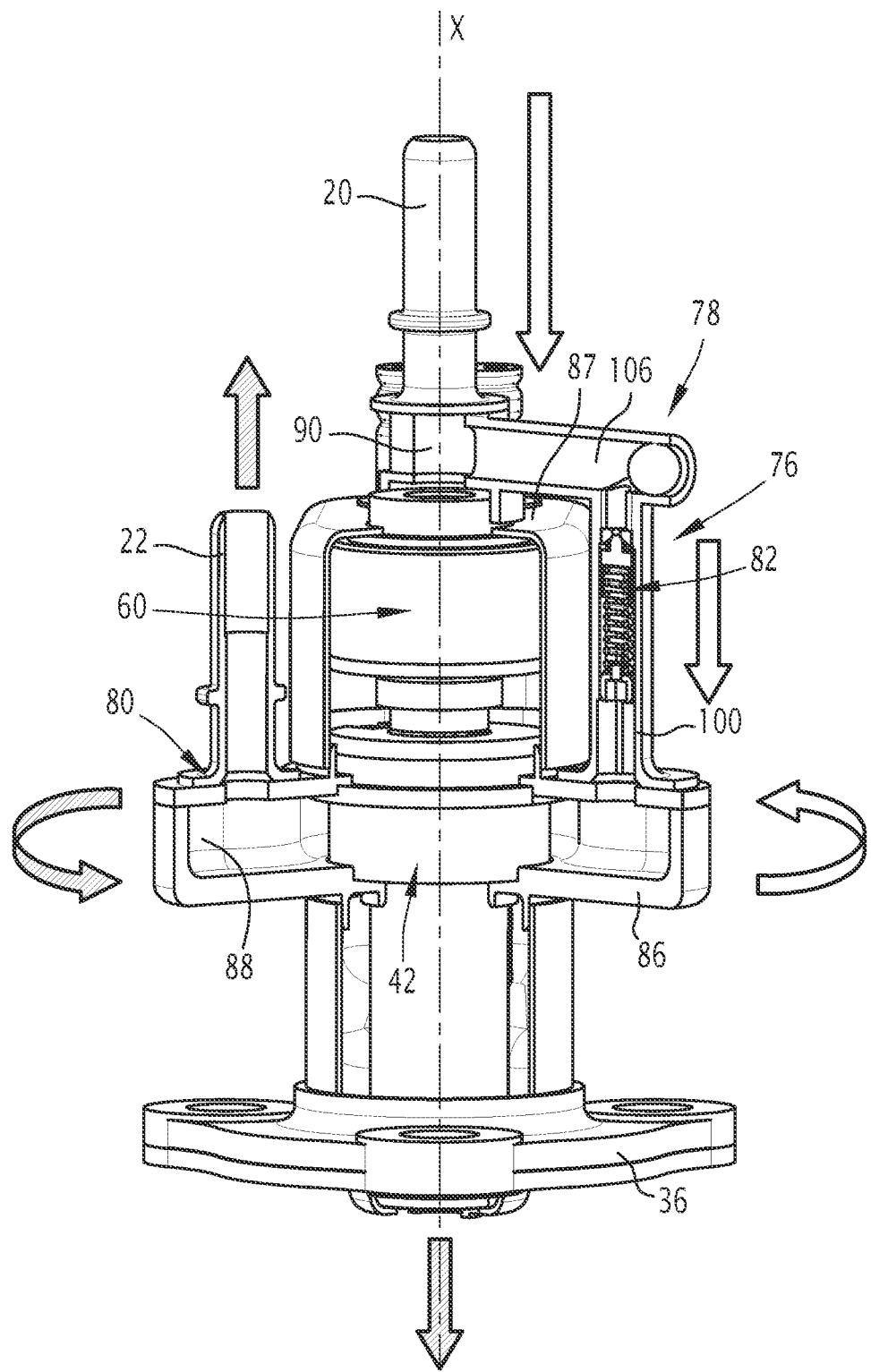
FIG. 3 is a perspective view of the injector of FIG. 2, seen from another angle, with other parts of the injector shown in cross-section.
Figure 4:
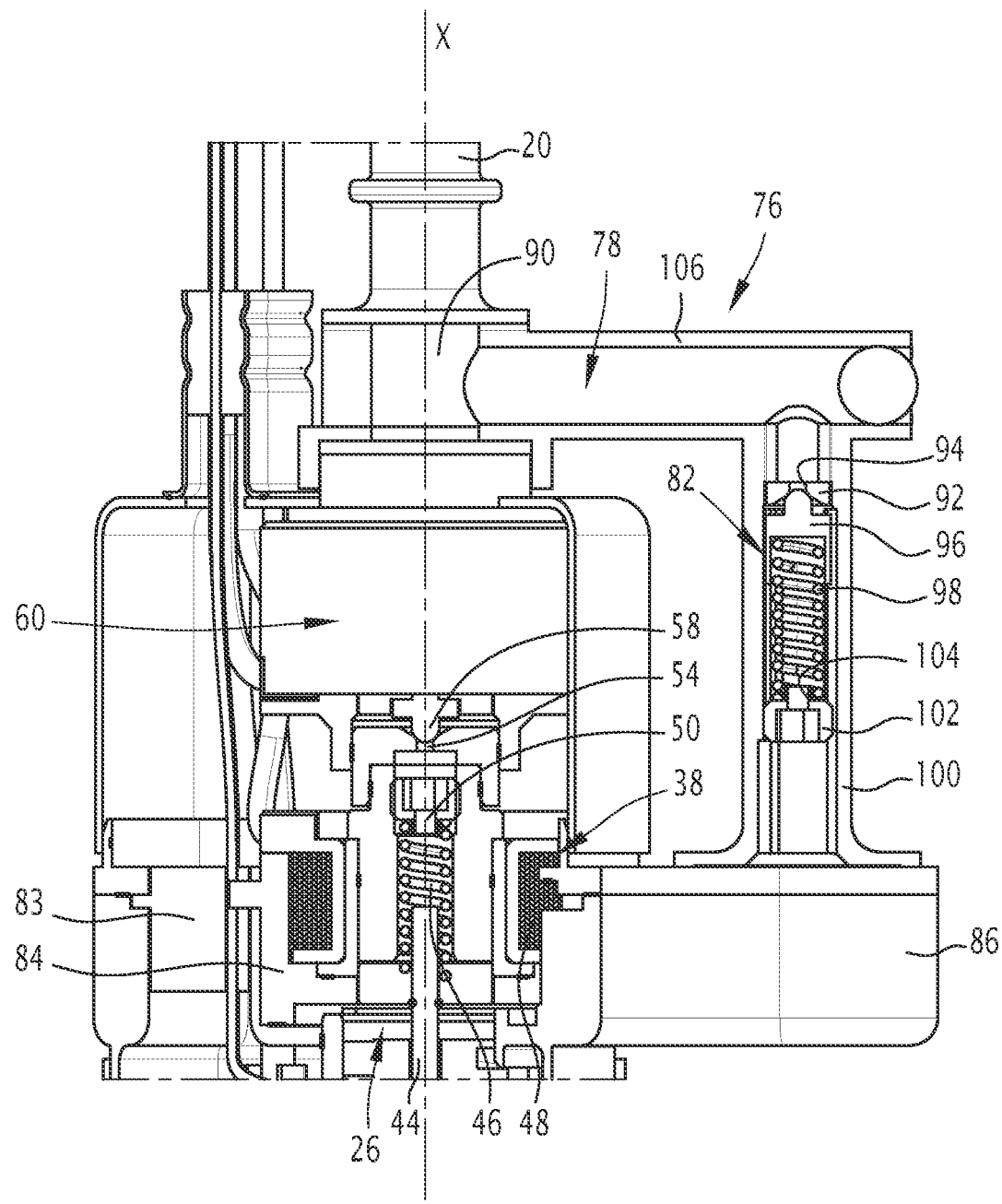
FIG. 4 is an enlarged view of part of the injector of FIG. 3, again with other parts of the injector shown in cross-section.

In addition, a fluid pressure regulator 82 is interposed in the cooling passage 76, as visible in FIGS. 2 through 4.

Specifically, the magnetic coil 48 is cooled by the circulation of fluid along the cooling passage 76.

To accomplish this, the cooling passage 76 comprises a cooling portion 83, arranged around the magnetic coil 48.

The cooling portion 83 is located radially outward from the magnetic coil 48. It adjoins the magnetic coil 48, such that fluid circulating through the cooling portion 83 is in thermal contact with the magnetic coil 48.

For example, the actuator 42 has a cover 84 surrounding the coil 48 and positioned outwardly of the coil 48. The cooling portion 83 is closed radially inwardly by the cover 84. In other words, the fluid flowing through the cooling portion 83 is directly in contact with the cover 84.

The cooling portion 83 extends over at least 30% of the periphery of the magnetic coil 48, preferably at least 50% and typically 75% of the periphery of the magnetic coil.

The cooling passage 76 also comprises an upstream chamber 86, fluidly communicating with the cooling portion 83 and located radially outward of the cooling portion 83. The upstream chamber 86 is connected through the upstream portion 78 to the injection passage 26.

As visible in the figures, the upstream chamber 86 projects radially outwardly from the injector in relation to the outer shell 87 covering the main injector members. This facilitates connection of the cooling portion 83 to the injection channel 26.

Similarly, the cooling passage 76 comprises a downstream chamber 88, fluidly communicating with the cooling portion 83 and located radially outward of the cooling portion 83.

In the example shown, the downstream chamber 88 constitutes the downstream portion 80 of the cooling passage.

The outlet 22 is supported directly by the downstream chamber 88.

Again, the downstream chamber 88 projects radially outward from the outer shell 87 covering the main injector members. This facilitates the location of the outlet 22 and the connection of this outlet 22 to the reservoir 28.

As seen in particular in FIG. 3, the upstream portion 78 opens into an inlet section 90 of the injection passage located between the fluid inlet 20 and the intermediate section 50.

More specifically, the inlet section 90 is located between the fluid inlet 20 and the other intermediate section 74.

The pressure regulator 82 is configured to regulate the pressure of fluid entering through the fluid inlet 20.

As seen in FIGS. 2 through 4, the pressure regulator 82 has a base 92 closing a section of the cooling passage 76 with an opening 94 for regulating the passage of the fluid.

The pressure regulator 82 also comprises a piston 96, a flexible member 98 arranged to bias the piston 96 into a closed position of closing the regulating opening 94, the piston 96 being movable under the effect of the fluid pressure against a bias exerted by the flexible member 96 from its closed position into a range of positions in which the regulating opening 94 is open.

In other words, the pressure exerted by the fluid entering through the inlet 20 causes the piston 96 to rise and move away from the base 92.

The cooling passage 76 comprises a pipe 100 in which the pressure regulator 82 is housed.

The base 92 is arranged in an upstream end part of the pipe 100, completely closing the pipe 100, with only the opening 94 remaining free for the passage of fluid.

A support ring 102 is rigidly fixed inside a downstream end part of the pipe 100. The ring 102 has a central passage opening 104 for the fluid.

The flexible member 98 is a coil spring, for example. This spring rests on one side on the ring 102, and on the opposite side on the piston 96. The ring 102 makes it possible to adjust the bearing force exerted by the flexible member 98 on the piston 96.

This adjustment is made by applying a certain air pressure upstream of the base 92. The ring 102 is moved in the pipe 100 towards the base 92, increasingly compressing the flexible member 98 until the air flow rate drops to 0. The ring 102 is then locked in position in the pipe 100, by spot welding, for example.

The piston 96 moves within an intermediate part of the pipe 100, this intermediate part extending between the base 92 and the ring 102. The outer section of the piston 96 substantially corresponds to the inner section of the intermediate part of the pipe 100, so this intermediate part acts as a cylinder for the piston 96.

When the piston 96 is in a clearance position, the flow of fluid between the piston 96 and the pipe 100 is possible through notches, not shown, created for this purpose on the periphery of the piston 96. Thus, the flow of fluid in the cooling passage is possible in the clearance position of the piston.

In the example shown, the pipe 100 is straight, and is carried by the upstream chamber 86. The pipe 100 extends substantially parallel to the X axis. The upstream portion 78 further comprises a radial branch 106, substantially rectilinear, connecting the upstream end part of the pipe 100 to the inlet section 90.

All the elements of the pressure regulator 82 are made of a material that is chemically resistant to the fluid injected and resistant to temperature. This fluid is typically an alkaline solution with a pH of up to 10. The pressure regulator is exposed to temperatures ranging from −40° C. to +120° C.

Preferably, the elements of the pressure regulator 82 are made of stainless steel, such as an austenitic steel.

The operation of the assembly 14 will now be described.

When the engine 4 is running, the assembly 14 injects fluid into the exhaust pipe 12.

To do this, the pump 30 draws fluid from the reservoir 28 and delivers it to the injector 18.

The fluid is received through the inlet 20 and flows to the inlet section 90.

It is distributed partly in the injection passage 26 and partly in the cooling passage 76.

The shut-off device 38 and the other shut-off device 56 are opened and closed in a timed manner to admit the fluid into the heating chamber 40, heat it within the chamber 40, and then, when the fluid has reached a set temperature, inject it into the exhaust pipe 12. The shut-off device 38 and the other shut-off device 56 are controlled by a control member, not shown, programmed for this purpose.

The actuator 42, which is located relatively close to the exhaust pipe 12, undergoes pronounced heating when high-temperature exhaust gases flow through the exhaust pipe.

It is kept at a reasonable temperature by the fluid circulating through the cooling passage 76.

This fluid flows first through the upstream portion 78 to the upstream chamber 86. From the upstream chamber 86, it flows along the cooling portion 83 to the downstream chamber 88. From the downstream chamber 88, it flows into the outlet 22 and back to the reservoir 28.

Under the effect of the pressure of the fluid arriving through the inlet 20, the piston 96 is moved into its clearance position range, against the restoring force of the flexible member 98. The fluid can then flow along the cooling passage.

When the fluid pressure varies at the injector inlet 20 due to the operation of the pump 30, the force exerted by the fluid on the piston 96 also varies.

If the fluid pressure at inlet 20 decreases, the flexible member 98 will move the piston 96 toward the base 92, which will help compress the fluid and thus at least partially compensate for the decreased fluid pressure at the inlet 20.

Conversely, if the fluid pressure increases, the force exerted by the fluid on the piston 96 also increases, causing the piston to move away from the base 92. This displacement will at least partially compensate for the increased pressure at the inlet 20.

The injector described above has multiple advantages.

It makes it possible to maintain the actuator at a reasonable temperature, compatible with the proper operation of the actuator in the long term.

It makes it possible to attenuate the fluid pressure variations at the injector inlet, which contributes to obtaining a good metering of the quantity of fluid injected into the exhaust pipe by the injector.

The injector is particularly compact and easy to install onboard the vehicle, especially since it is the aqueous urea solution that is used as the heat transfer fluid.

The fact that the injector has only one fluid inlet also contributes to making it compact.

The fluid pressure regulator is integrated inside the injector, which further reduces the overall size of the system.

Due to its structure, the cooling passage can be adapted to injectors originally designed to be cooled by circulating a fluid such as engine coolant.

The injector may have multiple variants.

The injector does not necessarily have two shut-off devices, one controlling the admission of fluid into a heating chamber and the other controlling the ejection of fluid from the heating chamber. In a variant, the injector comprises only one shut-off device, shutting off the injection port.

The injector does not necessarily have a heating chamber.

The closing device is not necessarily a solenoid valve, with an actuator comprising a magnetic coil. The actuator can be of any suitable type.

Similarly, the fluid pressure regulator is not necessarily of the piston type. Other pressure regulators can be considered.

Figure 6:
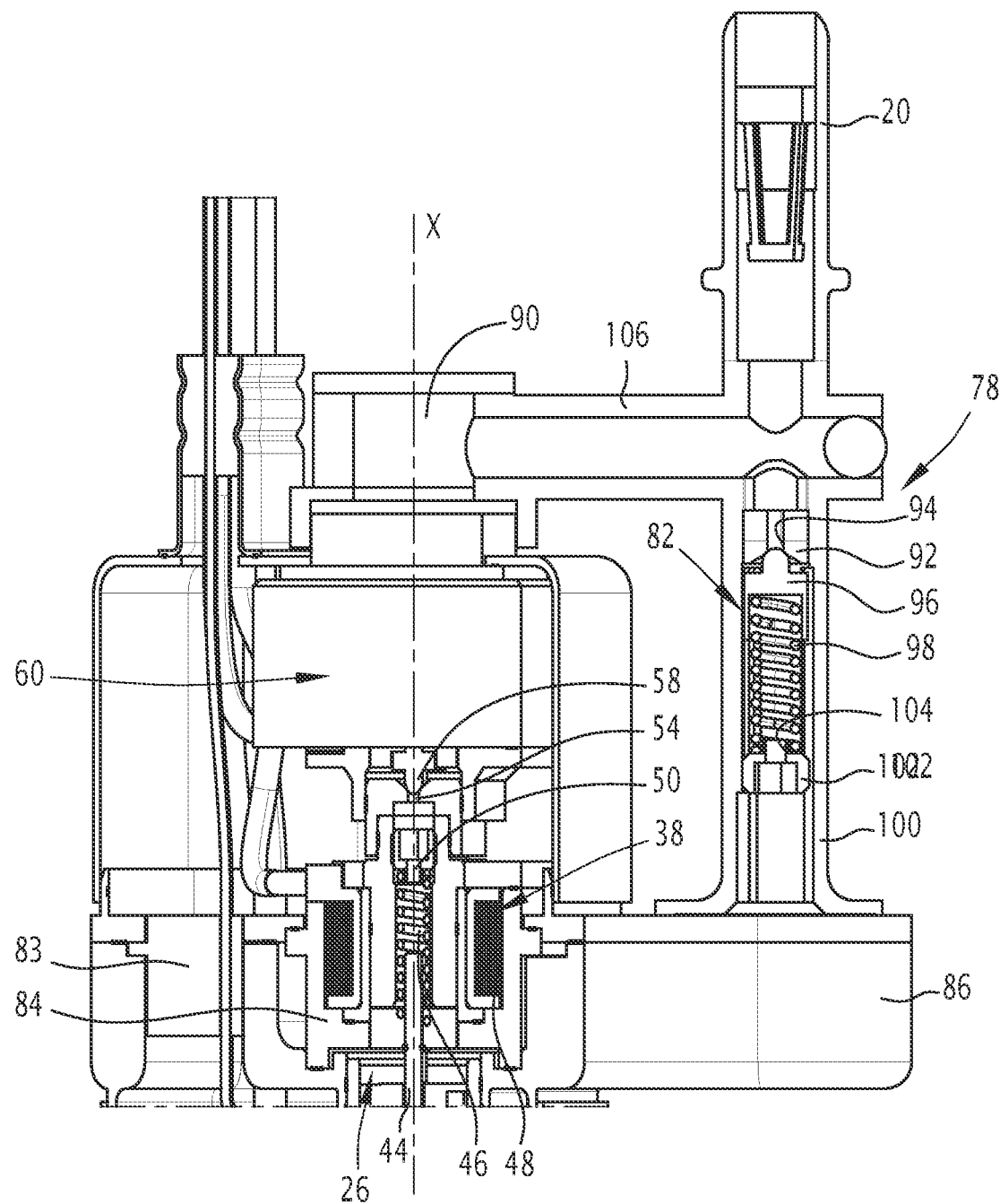
FIG. 6 is a view similar to FIG. 4, for a variant embodiment of the disclosure.

A variant is shown in FIG. 6.

Only the points in which this variant differs from that of FIGS. 1 to 5 will be detailed below. The elements that are identical or perform the same functions will be designated by the same references as in the variant of FIGS. 1 to 5.

In the variant shown in FIG. 6, the fluid inlet 20 is placed in the extension of the pipe 100. It is not along the X axis.

The radial branch 106 thus belongs to the injection passage 26, the fluid circulating in this radial branch from the fluid inlet 20 to the inlet section 90.

This variant is advantageous for adjusting the bearing force exerted by the flexible member 98 on the piston 96.

This adjustment is made in the variant shown in FIG. 6 by inserting a load sensor through the fluid inlet 20, and placing abutting the piston 96 through the opening 94. The position of the ring 102 is fixed when the force measured by the load sensor corresponds to the desired pressure to cause the piston 96 to lift from the base 92.

This procedure enables direct and easy calibration of the opening pressure of the pressure regulator 82.

Although various embodiments have been disclosed, a worker of ordinary skill in this art would recognize that certain modifications would come within the scope of this disclosure. For that reason, the following claims should be studied to determine the true scope and content of this disclosure.

The invention claimed is:

1. An injector of fluid in an exhaust pipe, the fluid being an aqueous urea solution, the injector comprising:
   a single fluid inlet;
   a fluid outlet;
   an injection port to inject the fluid into the exhaust pipe;
   an injection passage, fluidly connecting the single fluid inlet to the injection port;
   a shut-off device comprising a shutter, movable between an open position authorizing circulation of fluid through the injection port and a closed position prohibiting the circulation of fluid through the injection port, and an actuator, configured to selectively move the shutter between the open and closed positions the actuator having a magnetic coil is arranged around an intermediate section of the injection passage extending along a central axis;
   an outer shell, the shut-off device and the intermediate section of the injection passage being housed inside the outer shell;
   a cooling passage, having an upstream portion fluidly branched to the injection passage and a downstream portion fluidly connected to the fluid outlet, the cooling passage being configured so that fluid flow along the cooling passage cools the actuator of the shut-off device the cooling passage comprising a cooling portion arranged around the magnetic coil such that the magnetic coil is cooled by circulation of fluid; and a fluid pressure regulator interposed in the cooling passage.

2. The injector according to claim 1, wherein the fluid pressure regulator is configured to regulate a pressure of the fluid entering through the single fluid inlet.

3. The injector according to claim 1, wherein the fluid pressure regulator comprises a base closing a section of the cooling passage with a regulating opening for passage of the fluid, a piston, a flexible member arranged to bias the piston in a closed position of closing the regulating opening, the piston being movable under an effect of fluid pressure against a bias exerted by the flexible member from the closed position into a range of positions in which the regulating opening is open.

4. The injector according to claim 1, wherein the cooling passage comprises an upstream chamber fluidly communicating with the cooling portion and located radially outwardly of the cooling portion, and a downstream chamber fluidly communicating with the cooling portion and located radially outwardly of the cooling portion, the upstream portion connecting the upstream chamber to the injection passage.

5. The injector according to claim 4, wherein the fluid pressure regulator is arranged in the upstream portion.

6. The injector according to claim 4, wherein the upstream portion opens into an inlet section of the injection passage located between the single fluid inlet and the intermediate section.

7. The injector according to claim 1, wherein the injection passage comprises a fluid heating chamber and a fluid inlet port opening into the fluid heating chamber, the injector comprising a further shut-off device comprising a further shutter, movable between an open position authorizing circulation of fluid through the fluid inlet port and a closed position prohibiting the circulation of fluid through the fluid inlet port, and another actuator configured to selectively move the further shutter between the open and closed positions.

8. An assembly comprising a fluid reservoir, a pump having suction connected to the fluid reservoir and a discharge, and the injector according to claim 1, the single fluid inlet being fluidly connected to the discharge of the pump and the fluid outlet being fluidly connected to the fluid reservoir.

9. An exhaust line comprising an exhaust pipe and the assembly according to claim 8, the injector configured to inject fluid into the exhaust pipe.

10. The injector according to claim 1, wherein the shutter closes the injection port in the closed position.

11. The injector according to claim 1, wherein the actuator has a cover surrounding the magnetic coil and positioned outwardly of the magnetic coil, the cooling portion of the cooling passage being closed radially inwardly by the cover.

12. The injector according to claim 11, wherein the fluid flowing through the cooling portion is directly in contact with the cover.

* * * * *